US010779647B2

(12) United States Patent
Amit

(10) Patent No.: US 10,779,647 B2
(45) Date of Patent: Sep. 22, 2020

(54) OFFICE FURNITURE SYSTEM WITH INTEGRATED DIGITAL RESOURCES

(71) Applicant: New Deal Design, LLC, San Francisco, CA (US)

(72) Inventor: Gadi Amit, San Mateo, CA (US)

(73) Assignee: NEW DEAL DESIGN, LLC, San Francisco, CA (US)

( * ) Notice: Subject to any disclaimer, the term of this patent is extended or adjusted under 35 U.S.C. 154(b) by 0 days.

(21) Appl. No.: 16/105,809

(22) Filed: Aug. 20, 2018

(65) Prior Publication Data

US 2018/0368572 A1    Dec. 27, 2018

Related U.S. Application Data

(60) Provisional application No. 62/523,189, filed on Jun. 21, 2017.

(51) Int. Cl.
| | | |
|---|---|---|
| *A47B 83/00* | (2006.01) | |
| *F21V 33/00* | (2006.01) | |
| *F21V 23/04* | (2006.01) | |
| *F21S 10/02* | (2006.01) | |
| *H04N 7/14* | (2006.01) | |
| *H05B 45/20* | (2020.01) | |
| *H05B 47/105* | (2020.01) | |
| *F21V 23/00* | (2015.01) | |
| *H04N 7/15* | (2006.01) | |

(Continued)

(52) U.S. Cl.
CPC .......... *A47B 83/001* (2013.01); *F21S 10/023* (2013.01); *F21V 23/045* (2013.01); *F21V 23/0442* (2013.01); *F21V 23/0478* (2013.01); *F21V 33/0012* (2013.01); *H04N 7/142* (2013.01); *H05B 45/20* (2020.01); *H05B 47/105* (2020.01); *A47B 2200/0071* (2013.01); *A47B 2200/0079* (2013.01); *A47B 2220/0075* (2013.01); *F21V 23/003* (2013.01); *F21W 2131/301* (2013.01); *F21W 2131/402* (2013.01); *F21Y 2113/13* (2016.08); *F21Y 2115/10* (2016.08); *H04N 7/144* (2013.01); *H04N 7/15* (2013.01)

(58) Field of Classification Search
CPC ............ A47B 21/00; A47B 2021/0076; A47B 2200/0066; A47B 83/001; E04B 2002/7486; E04B 9/006; E04B 2/74; E04B 2002/0286; E04H 1/1255
USPC ............. 108/50.01, 50.02, 23; 52/36.1, 239; 312/196, 223.3
See application file for complete search history.

(56) References Cited

U.S. PATENT DOCUMENTS 5,350,337 A  *  9/1994  Kondo ...................... F24F 9/00
                                                     454/189
5,573,320 A  *  11/1996  Shearer .................. A47B 83/02
                                                     312/223.3

(Continued)

*Primary Examiner* — Jose V Chen
(74) *Attorney, Agent, or Firm* — Brad Bertoglio; Intelink Law Group, P.C.

(57) ABSTRACT

An office furniture component provides an enclosure defining an interior work space, the enclosure having at least three walls and one or more open sides via which the interior work space may be accessed. A flat work surface may be provided within the interior space. Electronic systems may be installed within the furniture component, such as display screens, cameras, and lighting systems. A lighting controller may implement contextual lighting to vary work space illumination in response to occupant use of the work space.

36 Claims, 10 Drawing Sheets

(51) Int. Cl.
*F21Y 115/10* (2016.01)
*F21Y 113/13* (2016.01)
*F21W 131/301* (2006.01)
*F21W 131/402* (2006.01)

(56) References Cited

U.S. PATENT DOCUMENTS

| | | | | |
|---|---|---|---|---|
| 5,687,513 | A * | 11/1997 | Baloga | A47B 83/001 52/32 |
| 5,826,941 | A * | 10/1998 | Olsen | A47C 16/02 297/423.39 |
| 6,296,408 | B1 * | 10/2001 | Larkin | A47B 83/001 400/681 |
| 6,474,025 | B1 * | 11/2002 | Faiks | A47B 21/00 52/36.1 |
| 7,677,182 | B2 * | 3/2010 | Mueller | A47B 21/00 108/50.01 |
| 9,612,849 | B1 * | 4/2017 | Gildein, II | G06F 9/44505 |
| 9,622,570 | B1 * | 4/2017 | Holdredge | E04B 2/7405 |
| 9,921,726 | B1 * | 3/2018 | Sculley | H04L 9/3231 |
| 9,949,562 | B2 * | 4/2018 | Carson | A47B 21/06 |
| 10,159,342 | B2 * | 12/2018 | Gaschy | A47B 83/001 |
| D850,130 | S * | 6/2019 | Webb | D6/338 |
| 2003/0202317 | A1 * | 10/2003 | Jans | A47B 21/00 361/679.6 |
| 2006/0119233 | A1 * | 6/2006 | Thomas | A47B 21/00 312/235.9 |
| 2007/0271856 | A1 * | 11/2007 | Ludwig | A47B 83/00 52/36.1 |
| 2009/0133609 | A1 * | 5/2009 | Nethken | A47B 21/02 108/50.02 |
| 2009/0154079 | A1 * | 6/2009 | Bae | A47B 21/00 361/679.02 |
| 2009/0284655 | A1 * | 11/2009 | Lukes | A47B 21/007 348/552 |
| 2010/0198374 | A1 * | 8/2010 | Carson | G16H 20/30 700/90 |
| 2012/0318918 | A1 * | 12/2012 | Johnson | B64D 11/06 244/118.6 |
| 2013/0199420 | A1 * | 8/2013 | Hjelm | A47B 21/00 108/20 |
| 2015/0300010 | A1 * | 10/2015 | Loffler | E04B 2/7437 52/36.5 |
| 2016/0260019 | A1 | 9/2016 | Riquelme Ruiz | A47B 21/007 |
| 2017/0135587 | A1 * | 5/2017 | Desroches | G16H 20/30 |
| 2017/0238706 | A1 * | 8/2017 | Arthur | A47B 21/06 |

* cited by examiner

OFFICE FURNITURE SYSTEM WITH INTEGRATED DIGITAL RESOURCES

TECHNICAL FIELD

The present disclosure relates in general to office furniture, and in particular to office furniture systems integrating digital resources.

BACKGROUND

Modern workplaces increasingly rely on digital tools and technology for productivity and worker interaction. Digital communication and collaboration technologies enable great flexibility in user interaction, combining on demand audio telephony, video telephony, text-based chat, desktop sharing, document sharing, and other forms of electronic interaction. However, most companies still involve some level of aggregation of individuals within one or more common workplaces. Many types of interaction may also benefit from in-person engagement. Therefore, it may be desirable to provide work spaces with enhanced flexibility to effectively enable solo and group work, with individuals present locally and/or remotely.

SUMMARY

An office furniture system may be utilized to enhance user focus, in solo or group applications, while facilitating seamless integration of digital solutions, interaction with remote workers and enhanced digital immersion. In accordance with some embodiments, an enclosure may be mounted on a support, such as a pedestal and base. The support may be height-adjustable, such as via implementation of an electric or pneumatic lift within the pedestal.

In some embodiments, the enclosure may include top, bottom, left and right surface, thereby forming a continuous loop defining an interior space with open front and back sides. In other embodiments, varying combinations of enclosure surfaces and mounting mechanisms may be employed. A work surface is preferably contained within the enclosure. Individuals may position themselves around the work surface, such as at open front and back sides, for interaction amongst one another and/or with integrated technology systems. Integrated technology systems may include display screens, cameras, speakers and lighting. Integrated technology systems may be beneficially utilized for video conferencing and other digital interaction with remote individuals. Embodiments may provide many of the benefits of a traditional conference room or individual office, with a significantly reduced cost, installation burden and space requirement.

DETAILED DESCRIPTION OF THE DRAWINGS

Figure 1:
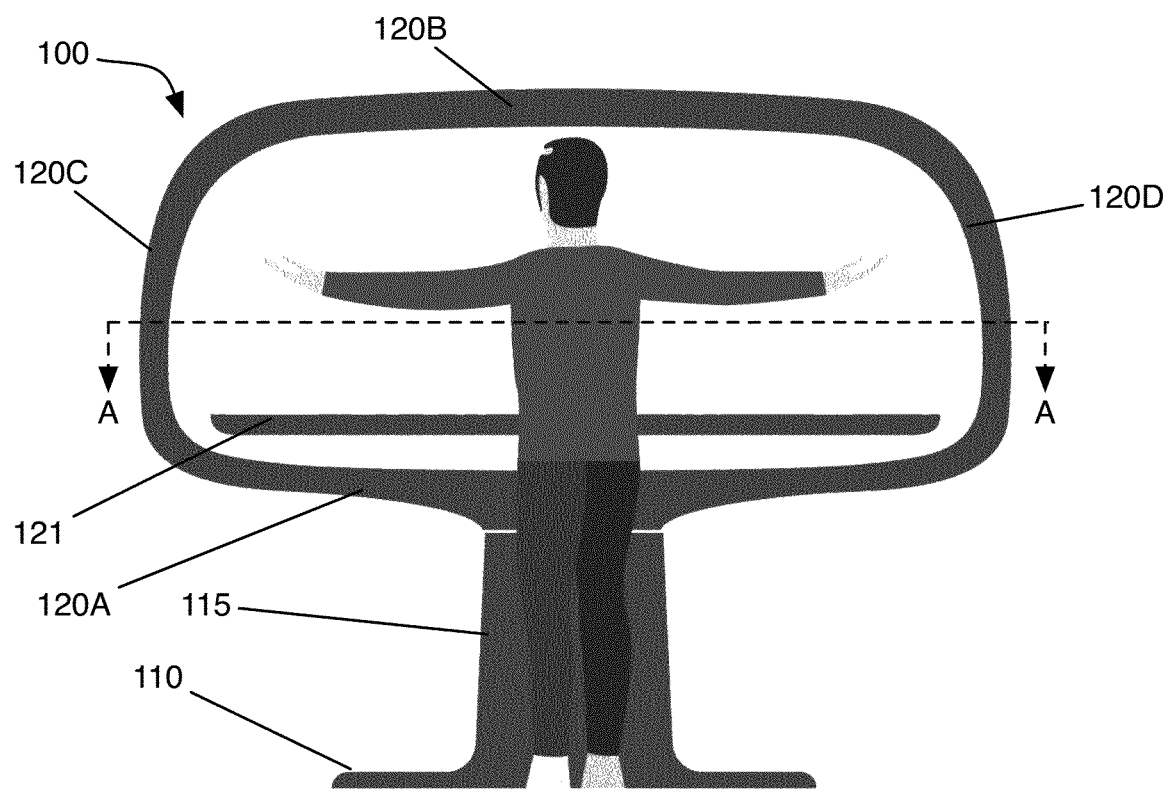
FIG. 1 is a front elevation of a workspace furniture system with integrated technology systems, in accordance with a first embodiment.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

In some embodiments, a workplace furniture concept provides high levels of flexibility, so that users can rapidly and easily shift between solo work by an individual worker, group work amongst multiple individuals, and remote work interacting digitally with others not physically present. Such systems may provide organizations with better space utilization, as well as an ability to readily scale worker resources up and down, both physically and digitally.

FIG. 1 is front elevation of a multi-user workspace furniture piece, in accordance with a first exemplary embodiment. The workspace 100 includes base 110, pedestal 115 and enclosure 120. Base 110 rests on a ground surface, and provide physical stability for workspace 100. In the embodiment of FIG. 1, base 110 is a generally flat, rigid component, which may be weighted and/or physically secured to a ground surface, in circumstances where added stability is necessary or desired.

Figure 2:
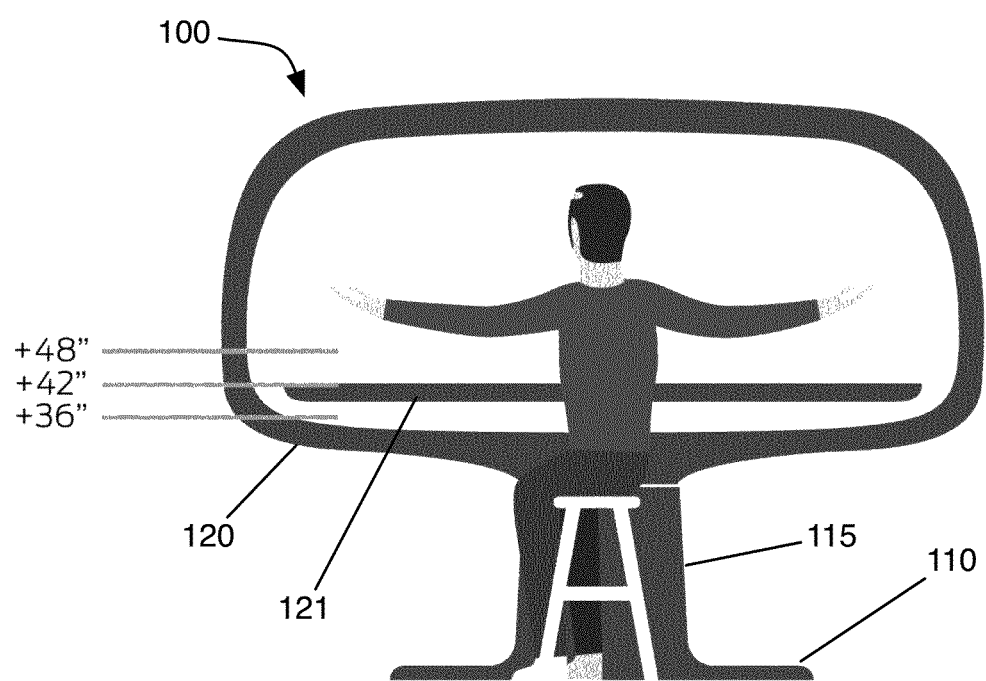
FIG. 2 is a front elevation of the workspace of FIG. 1, in a counter stool height configuration.

Pedestal 115 attaches to base 110, and supports enclosure 120 above base 110 and a floor on which the workspace is installed. Preferably, pedestal 115 includes a height adjustment mechanism, such as an electric or pneumatic lift (preferably internal to pedestal 115), allowing users to easily and dynamically switch between standing and seated positions while keeping the user's work surface at a convenient elevation. FIG. 1 illustrates workspace 100 positioned at a standing height, with work surface 121 (described below) at height of 48 inches. FIG. 2 illustrates workspace 100 positioned at a counter-stool height, such that the top of work surface 121 resides at a height of 42 inches. Optionally, pedestal 115 may operate to position work surface 121 at even lower heights, such as a seated height of 36 inches.

Enclosure 120 serves to, amongst other things, partially enclose a workspace within which, or through which, multiple individuals may interact, with each other and/or with various technology resources. In the embodiment of FIG. 1, enclosure 120 is formed from bottom surface 120A, top surface 120B, left side surface 120C and right side surface 120D, forming a loop around an interior space, with fully open front and back portions of the enclosure providing apertures through which users may access the enclosure interior. Transitions between top surface 120B and side surfaces 120C and 120D, and transitions between bottom surface 120A and side surfaces 120C and 120D, are preferably rounded, providing an organic, pleasing and physically safe space while also helping to diffuse sound within the workplace.

Enclosure 120 may be formed from a variety of materials and combinations of materials, including, without limitation: fabric, fiberglass, plastic, metal or wood. Preferably, portions of workspace 100, and particularly the interior of enclosure 120, include soft surfaces (e.g. fabric- or foam-covered surfaces) to further dampen sound. Workspace 100 further includes work surface 121, mounted within the space enclosed by enclosure 120. Work surface 121 is a solid, rigid, flat surface, comparable to a desktop or tabletop, supporting workspace users and the items with which they work.

In the embodiment of FIG. 1, the space enclosed by enclosure 120 is approximately seven feet in length, and three feet in width, providing a comfortable work area for up to six individuals, with three positioned at the open front side and three positioned at the open back side of the enclosure. In other embodiments, differing dimensions may be used. Work surface 121 provides a common surface on which users may work, support technology and documents, and interact. In the illustrated embodiment, enclosure surfaces 120A-D are formed from solid, opaque material, although it is contemplated and understood that some or all such surfaces may alternatively be formed from translucent or transparent materials.

Figure 3:
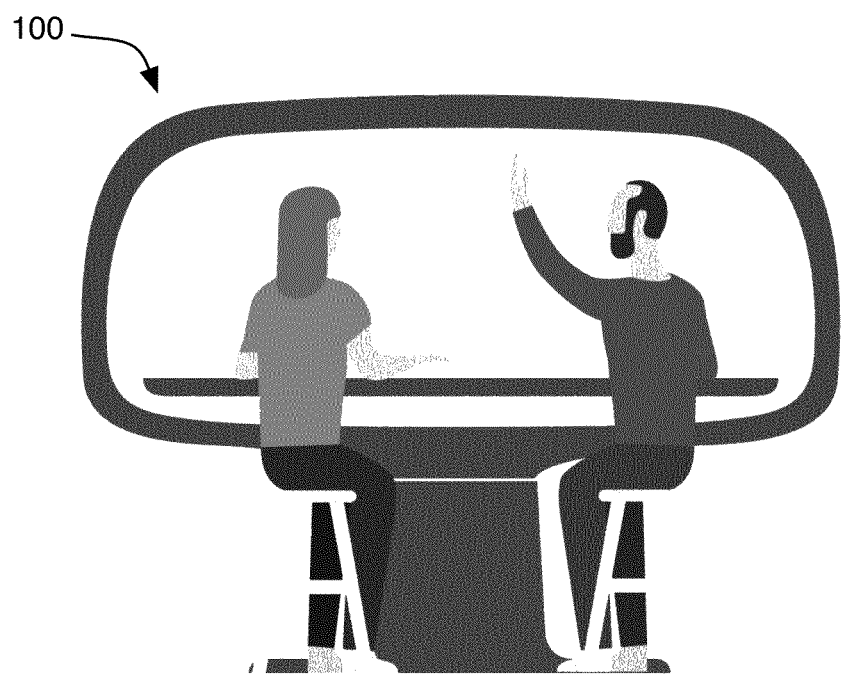
FIG. 3 is a front elevation of the workspace of FIG. 1, in use by two individuals.

FIG. 3 is a front elevation of workspace 100, with two individuals working together, positioned at the front opening of enclosure 120.

Figure 4:
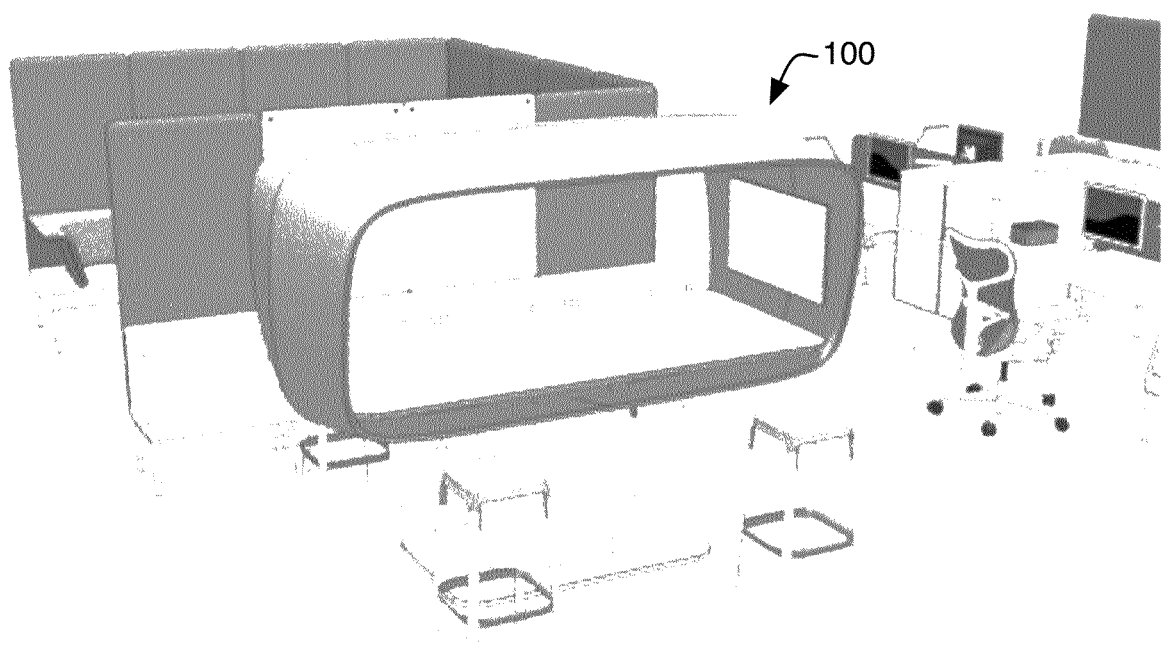
FIG. 4 is a top perspective view of a workspace installed within an open office environment.
Figure 5A:
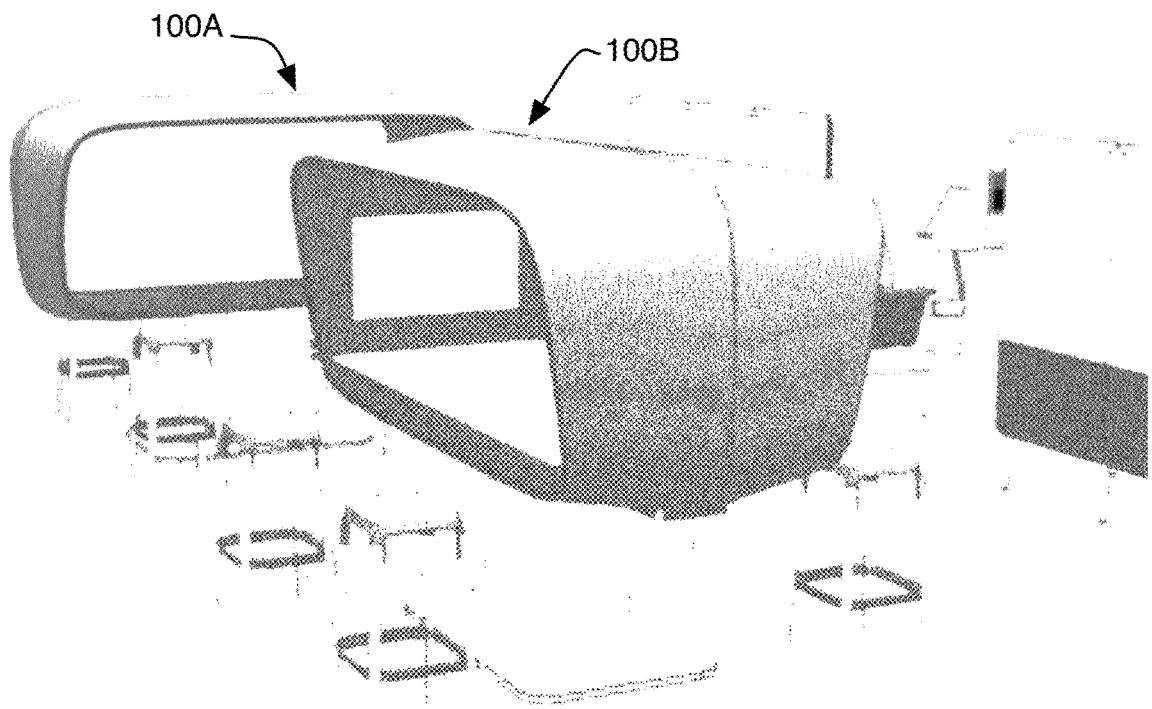
FIG. 5A is a top perspective view of two workspaces installed proximate one another within an open office environment.

FIG. 4 is a top perspective view of workspace 100, as positioned within an exemplary office environment. Due to its compact size, and the dynamic nature in which individuals may enter and withdraw from the work area, multiple workspaces 100 may be positioned within an office environment, potentially within a very compact footprint and without disrupting the overall flow of an open office plan. For example, FIG. 5 is a top perspective view of an exemplary workplace in which two workspaces 100A and 100B are positioned proximate one another. As illustrated, workspace 100B is oriented perpendicularly to workspace 100A; this arrangement enables workspaces 100A and 100B to be positioned near one another, while preserving various privacy and other benefits of the work space.

In the illustrated embodiment, the shape and configuration of enclosure 120 may provide one or more benefits to its users. One benefit is privacy; within a potentially crowded and open office space, workspace 100 may be used to limit the ability of individuals outside the work space to perceive the activities of users working within the workspace, visually and (to some extent) acoustically. However, such privacy can be achieved by workspace 100 without the significant real estate footprint of a dedicated, closed conference room. Some level of privacy may also be achieved while mitigating the isolating effects of enclosed conference rooms and maintaining opportunities for selective dynamic interaction with others in the workplace.

Another benefit of some embodiments is elimination of distractions for users. For users working within a space defined by enclosure 120, enclosure surfaces 120A-D may limit the users' visual (and to some extent, acoustic) perception of other activity within the workplace, thereby promoting improved focus on the task at hand.

Figure 5B:
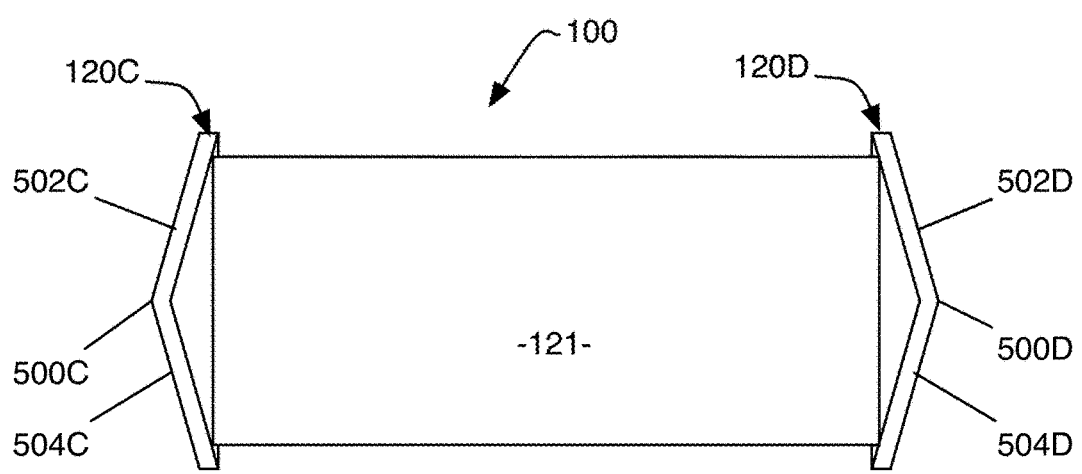
FIG. 5B is a top plan cutaway view of a workspace, further illustrating the cross-sectional form of workspace surfaces.

In some embodiments, it may be desirable for the walls of enclosure 120 to have interior and/or exterior surfaces that are not flat, further helping to diffuse sound generated within or outside the enclosure. For example, the walls of enclosure 120, as illustrated in, for example, the perspective view of FIG. 5A, feature a cross-section forming a shallow V. FIG. 5B provides a further illustration of the shape of enclosure 120. FIG. 5B is a top plan cross-sectional view of enclosure 100, taken along cross-section A-A of FIG. 1. Enclosure side surfaces 120C and 120D each have a central ridge (for surface 120C, ridge 500C; for surface 120D, ridge 500D), joining two wall portions (for surface 120C, portions 502C and 504C; for surface 120D, portions 502D and 504D) forming a shallow obtuse angle. For sound generated within the workstation 100 (e.g. people seated over work surface 121 and conversing with one another), the shallow angles formed by the interior surfaces of wall portions 502C-504C, and by the interior surfaces of wall portions 502D-504D, may promote reflection of sound back towards the interior volume of enclosure 120, thereby promoting auditory privacy and isolation of workstation users. Likewise, for sound generated outside of enclosure 120, the obtuse angles formed by exterior surfaces 502C-504C, and by 502D-504D, may help reflect sound away from the interior volume of workstation 100, and otherwise serve to diffuse ambient sound within an area in which workstation 100 is installed.

While the embodiment of FIG. 5B illustrates enclosure surfaces forming a shallow angle to facilitate sound control, in other embodiments, it is contemplated that interior and/or exterior portions of the enclosure surfaces may have different cross-sections. For example, it may be desirable to utilize a curved surface on an interior or exterior portion of one or more of the enclosure top, bottom, or side surfaces. In some embodiments, a given surface may have an exterior surface with the same shape as its interior surface (e.g. as shown in FIG. 5B); in other embodiments, the interior and exterior surfaces of an enclosure wall may have differing shapes. In some embodiments, each of the top, bottom and side walls of an enclosure may feature the same or similar cross-sectional shape; in other embodiments, the cross-sectional shape of some enclosure walls may differ from others.

Figure 6A:
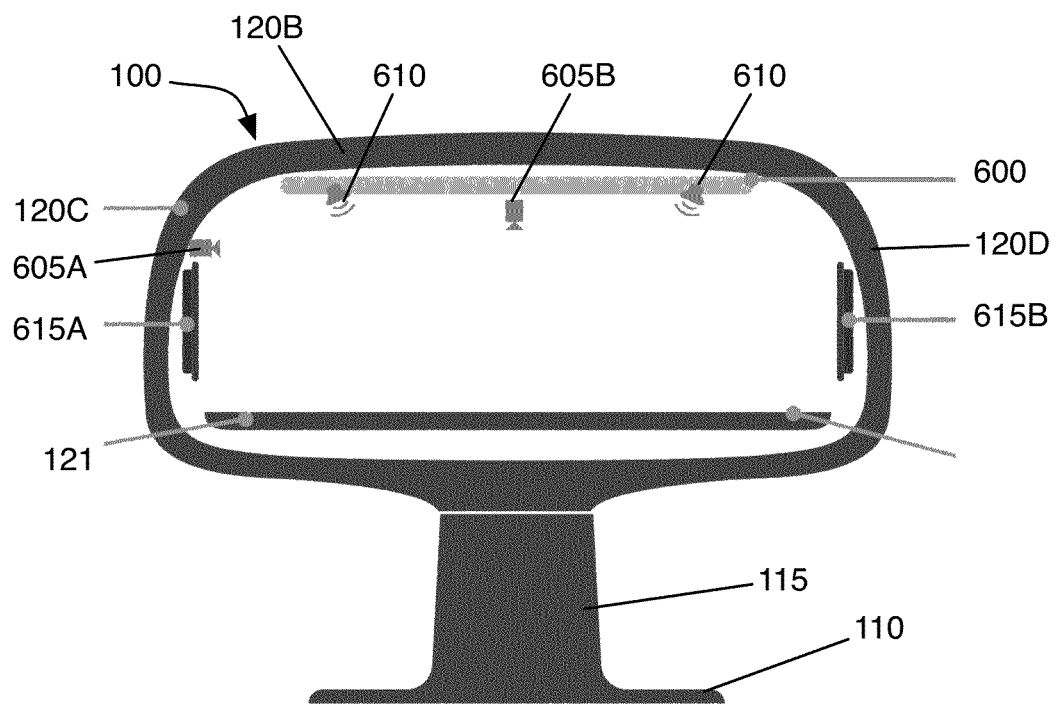
FIG. 6A is a schematic diagram of technology infrastructure installed within a workspace.

In some embodiments, a workspace may also integrate one or more technology systems serving to maximize the effectiveness of workers using the workspace—particularly, digital workers. An electronic spine may be routed through enclosure 120, pedestal 115 and base 110, for distribution of power and data signals amongst electronic systems, while also facilitating separation of manufacturing operations between traditional furniture materials and electronic subassemblies. FIG. 6A is a schematic diagram illustrating technology systems integrated within enclosure 120. Systems may include one or more of: lighting fixture 600, video cameras 605A-B (which each include microphones), audio speakers 610, left side display screen 615A and right side display screen 615B. Technology systems may be interconnected by an electronic spine routed through an interior cableway within the walls of enclosure 120, pedestal 115 and base 110. The electronic spine may include power and optionally low-voltage signaling distribution, such as Ethernet or USB connections.

One or more video cameras 605 may be mounted within enclosure 120, at least some of which will typically be directed towards the work area enclosed thereby. In the embodiment of FIG. 6A, a left side video camera 605A is mounted on the inner surface of enclosure left side 120C, facing along the length of space enclosed by enclosure 120. Preferably, video camera 605A has a field of view sufficient to capture one or more individuals positioned at the open front and back sides of enclosure 120, while also capturing objects on work surface 121, thereby providing an effective view for video conferencing with remote locations or participants. In some embodiments, camera 605A may include digital and/or physical tracking functionality to, for example, focus the camera field of view on an occupant of workspace 100 that is currently speaking. Other video cameras may be provided for alternative views of workspace 100. For example, top video camera 605B is positioned proximate the underside of enclosure top surface 120B, facing downwards towards work surface 121, providing a view that may be effective for, e.g., viewing documents or objects placed on work surface 121. Video cameras 605 may receive power from a power distribution network integrated within workspace 100, such that workspace 100 may be plugged into a power source to distribute power to a variety of devices that are integrated within and/or attachable to workspace 100. Video cameras 605 may be available for use with user computing devices (such as laptop computers, tablets, smartphones, or the like) via one or more data interconnection mechanisms, including, without limitation, one or more of: wireless Bluetooth connection, wireless Ethernet connection, or wired USB interconnect via a centralized panel for control and distribution (described further below).

Enclosure 120 also includes one or more speakers 610, which may be used for audio output. Speakers 610 will typically include integrated amplifiers, and may be available for connection with user computing devices via one or more data interconnection mechanisms, including, without limitation, one or more of: wireless Bluetooth connection, wireless Ethernet connection, or wired USB interconnect via a centralized panel for control and distribution.

Enclosure 120 may also be outfitted with one or more video display screens. In the embodiment of FIG. 6A, enclosure 120 is equipped with left side display screen 615A (mounted on the inside surface of enclosure left side 120C) and right side display screen 615B (mounted on the inside surface of enclosure right side 120D). Display screens 615 may be available for connection with user computing devices via one or more data interconnection mechanisms, including, without limitation, one or more of: wireless Bluetooth connection, wireless Ethernet connection, or wired video connection (such as HDMI) via a centralized panel for control and distribution. Display screens 615 may be beneficially utilized for, e.g., video conferencing, and sharing of digital images or computer display content amongst users of workspace 100.

Workspace 100 may also be outfitted with one or more audio microphones. Preferably, multiple microphones are distributed at varying locations on workspace 100. Microphones may be integrated within other devices (such as cameras 605 and/or display screens 615) and/or standalone. In some embodiments, background noise reduction circuitry may be employed to reduce microphone pickup of sound originating outside the space enclosed by enclosure 120; in such embodiments, it may be desirable to utilize an array of microphones both inside and outside of enclosure 120, such that exterior sounds may be isolated and attenuated from audio signals on interior microphones.

Figure 6B:
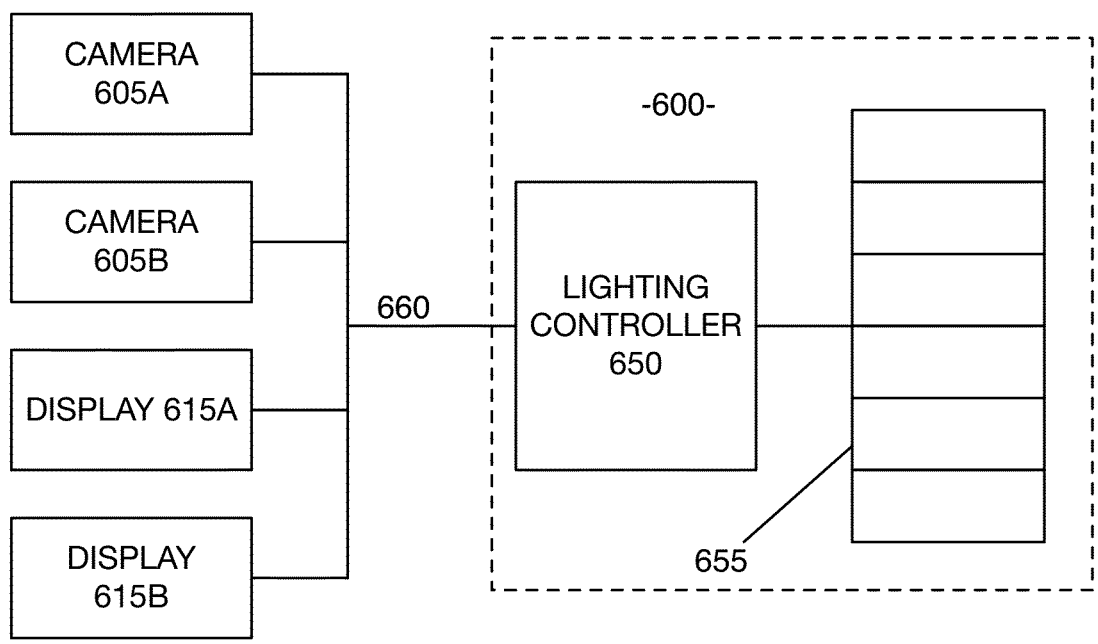
FIG. 6B is a top plan view of workspace cross-section A-A.

In operation, lighting fixture 600 may illuminate the space enclosed by enclosure 120, and also individuals positioned proximate the open front and open back sides of enclosure 120. Lighting fixture 600 preferably provides contextual illumination, with lighting patterns optimized for varying use cases of workspace 100, as well as ambient lighting conditions outside workspace 100. FIG. 6B is a schematic block diagram of a contextual lighting system, in accordance with an exemplary embodiment. Lighting fixture 600 includes lighting controller 650, as well as multiple, directional LED light sources 655, distributed over the length and width of the underside of enclosure top surface 120B. At least some of light sources 655 are preferably oriented towards work surface 121, to provide even illumination of work surface 121 and objects or documents positioned thereon. Others of light sources 655 may be oriented in other directions, as described elsewhere herein. Lighting controller 650 may further include communication links 660 facilitating interaction between controller 650 and one or more electronic devices provided within or use with workspace 100, such as camera 605A, camera 605B, display screen 615A and display screen 615B, such as for reporting of electronic device operational status to lighting controller 650. Whether via communication link 660, wireless communications, or otherwise, lighting controller 650 may receive inputs indicative of the operative status of a variety of electronic devices provided within, connected to, used within, or associated with workspace 100, such that contextual lighting scenes may be selected automatically to optimize lighting characteristics for the workspace occupants' current activities.

In some embodiments, lighting sources 655 may include multiple light sources of different color temperatures, with controller 650 operational to dynamically vary the color and intensity of lighting within enclosure 120 as a whole, or within specific portions of enclosure 120 and/or its surrounding area. Light color and intensity pattern may vary by a work application, as detected by, for example, device status reporting via communications link 660, network-based reporting, or context detection using local sensors installed within the enclosure. For example, in one use case, lighting fixture 600 may facilitate video conferencing with remote locations by effectively illuminating the faces and upper bodies of individuals working within workspace 100. Light fixture 600 may activate and/or increase the light intensity of a subset of light sources 655 oriented outwards, towards the open front and back sides of enclosure 120 (and therefore towards the faces of workspace 100 users situated around the enclosure), while side camera 605A is active, thereby providing effective videoconferencing illumination during video communications. Light fixture 600 may in turn deactivate or decrease the intensity of a subset of light sources 655 (particularly those oriented outwards) when side camera 605A is deactivated or inactive, so that the lighting environment is more visually pleasing to local participants and/or to reduce light pollution within an ambient environment surrounding workspace 100. These and other opportunities for dynamic and context-appropriate illumination of workspace 100 are provided by lighting fixture 600.

Other digital systems may be readily integrated within workspace 100. For example, workspace 100 may incorporate a conversation user interface agent, implementing functionality of, or analogous to, Amazon Alexa, Apple Siri, Google Home or the like. Workspace 100 may incorporate virtual reality or augmented reality user interface mechanisms, such that users of workspace 100 may utilize AR and VR systems within a safe and contained environment.

Arrays of speakers and microphones may be integrated with a beam-forming audio system, providing a narrow cone of audio perception and/or audio projection to minimize interaction outside of workspace 100 and provide heightened levels of privacy and security in communication. Workspace 100 may also include an integrated digital projector, e.g. for projecting imagery onto work surface 121 or another surface within enclosure 120.

In some embodiments, electronic components (e.g. lighting 600, cameras 605, speakers 610, microphones, display screen 615) may be modular components installed at mounting locations distributed throughout enclosure 120. In other embodiments, it may be desirable to combine two or more such components or systems into a common enclosure; such an embodiment may facilitate production by, e.g., enabling the electronics enclosure to be manufactured by an electronics manufacturing specialist, with the furniture components being manufactured by a furniture manufacturing specialist, with minimal install-side assembly and integration required. Such embodiments may also facilitate service and maintenance, by enabling the much-smaller electronics enclosure to be readily removed and shipped to a service facility, while leaving the furniture portions of workspace 100 in place. Such embodiments may also facilitate upgrading of electronic systems as technology advances, by allowing users to swap out the common electronics housing for upgraded capabilities, while leaving the more future-proof furniture components in place.

Figure 7:
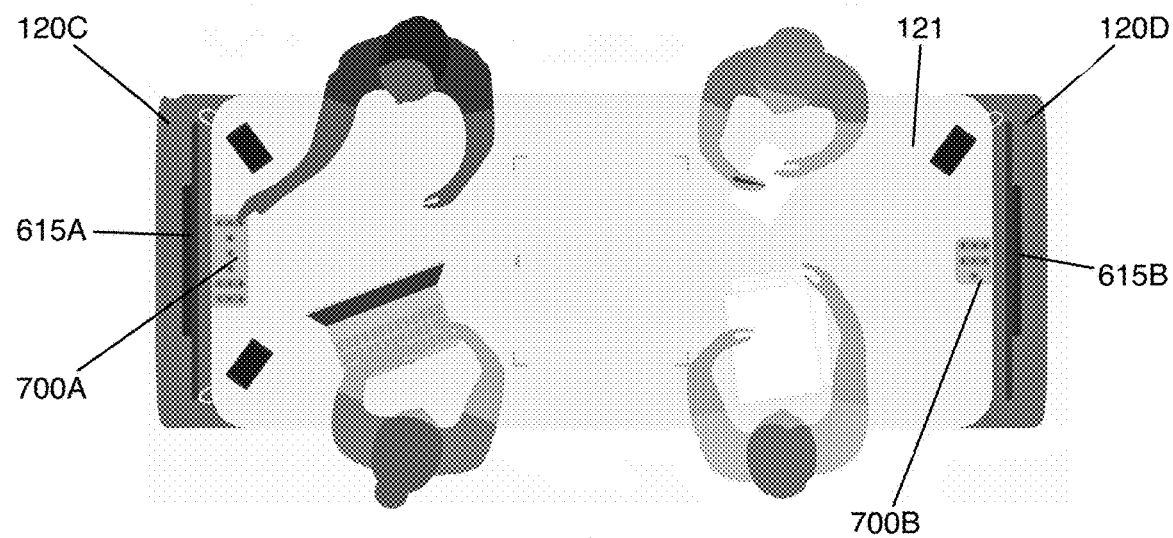
FIG. 7 is a partial cutaway top plan view of a workspace, in accordance with a first use case.

FIG. 7 is a top plan cutaway view of workspace 100, with enclosure top surface 120B omitted, depicting workspace 100 in use by four individuals working together. Left side control panel 700A is positioned on work surface 121 proximate left side enclosure surface 120C, while right side control panel 700B is positioned on work surface 121 proximate right side enclosure surface 120D, providing ready access to electronic systems control and integrations for users, regardless of their position within enclosure 100. Control panels 700 may include, without limitation, one or more of: physical buttons or softkeys for control of light fixture 600 and the height of pedestal 115; physical data interconnects to connect, e.g., user personal electronic devices with workspace 100 digital systems such as video cameras 605, speakers 610 or display screens 615; analog audio connections to speakers 610; and data and power connections to personal electronic devices (such as Apple lightning connectors, micro-USB connectors, USB-C connectors). In some embodiments, multiple technology systems integrated within the workspace 100 furniture piece may be presented to a user's personal electronic device as a single accessory having multimedia features (e.g. as a video display with camera, speakers and microphone) via a single data interconnect, such as a HDMI connection, USB-C connection, Bluetooth or Wifi. Workspace 100 may also include AC and/or DC power connections, such that users may easily charge devices while using the workspace.

Figure 8:
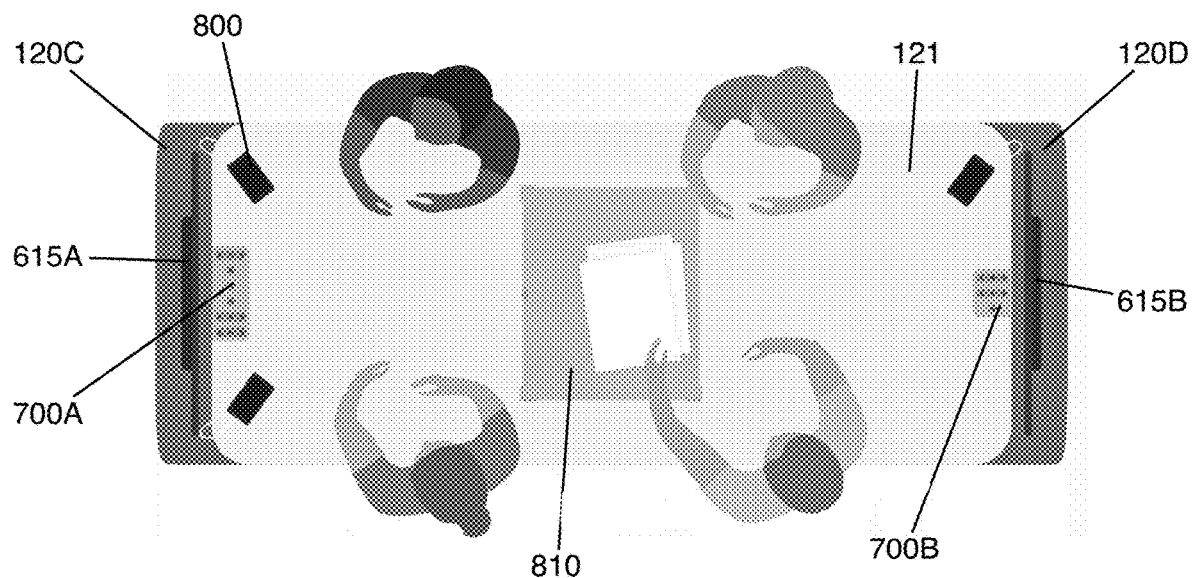
FIG. 8 is a partial cutaway top plan view of a workspace, in accordance with a second use case.

FIG. 8 is another top plan cutaway view of workspace 100, with enclosure top surface 120B omitted, depicting workspace 100 in use by four individuals interacting with remote workers, e.g. via videoconference. The users may face display screen 615A, on which remote conference participants are displayed, and left side video camera 605A (not shown). Video conferencing endpoint functionality may be implemented by a user personal electronic device (such as smart phone 800) interacting with enclosure devices for input and output of video and audio. For example, a user may implement Skype on their personal electronic device for remote conferencing, with the workspace 100 technology resources appearing to the user's device as a multimedia accessory. In such applications, audio and video systems integrated within workspace 100 may provide superior performance as compared to analogous functionality provided locally by a user's device. In other embodiments, a computing device capable of videoconferencing and other functionality may be integrated within workspace 100. In some embodiments, a display screen 615 may be implemented as a display device with integrated computing capabilities (such as a tablet computer, touchscreen personal computer, smart TV, or other display type with embedded computing capabilities), such that video conference and/or other functionality may be implemented directly by display 615. Region 810 on work surface 121 demarcates a field of view for top video camera 605B. Region 810 is preferably differentiated visually for workspace users, such as via physical markings integrated into work surface 121, and/or via contrasting lighting projected by light fixture 600, thereby indicating to users an area on which documents or objects should be positioned for optimal viewing by camera 605B and, therefore, remote work participants.

As illustrated herein, embodiments of workspace 100 may provide a flexible work environment, conducive to focus and collaboration, both locally and with remote participants—all in a compact physical footprint that may be easily and inexpensively installed in an open office floorplan.

While workspace 100 provides numerous benefits for multi-user applications, in other embodiments, different sizes and configurations may be beneficial to other use cases, such as providing an individual workspace with varying levels of visual and audible occlusion from the surrounding environment, potentially including some or all of the integrated and adaptive electronic systems described above in connection with the embodiment of FIG. 1-8. For example, while the embodiments of FIG. 1 et seq. provide an enclosure 120 with four solid sides, in other embodiments, one or more of sides 120A-120D may be wholly or partially omitted. In yet other embodiments, a front or back opening may be wholly or partially enclosed by a further enclosure side. In yet other embodiments, one or more sides of enclosure 120 may be formed from a flexible, movable materials, such as fabric, screening, plastic sheeting, or retractable paneling. These and other embodiments may be utilized to provide varying levels of visual and audible occlusion and user accept to the workspace.

Figure 9:
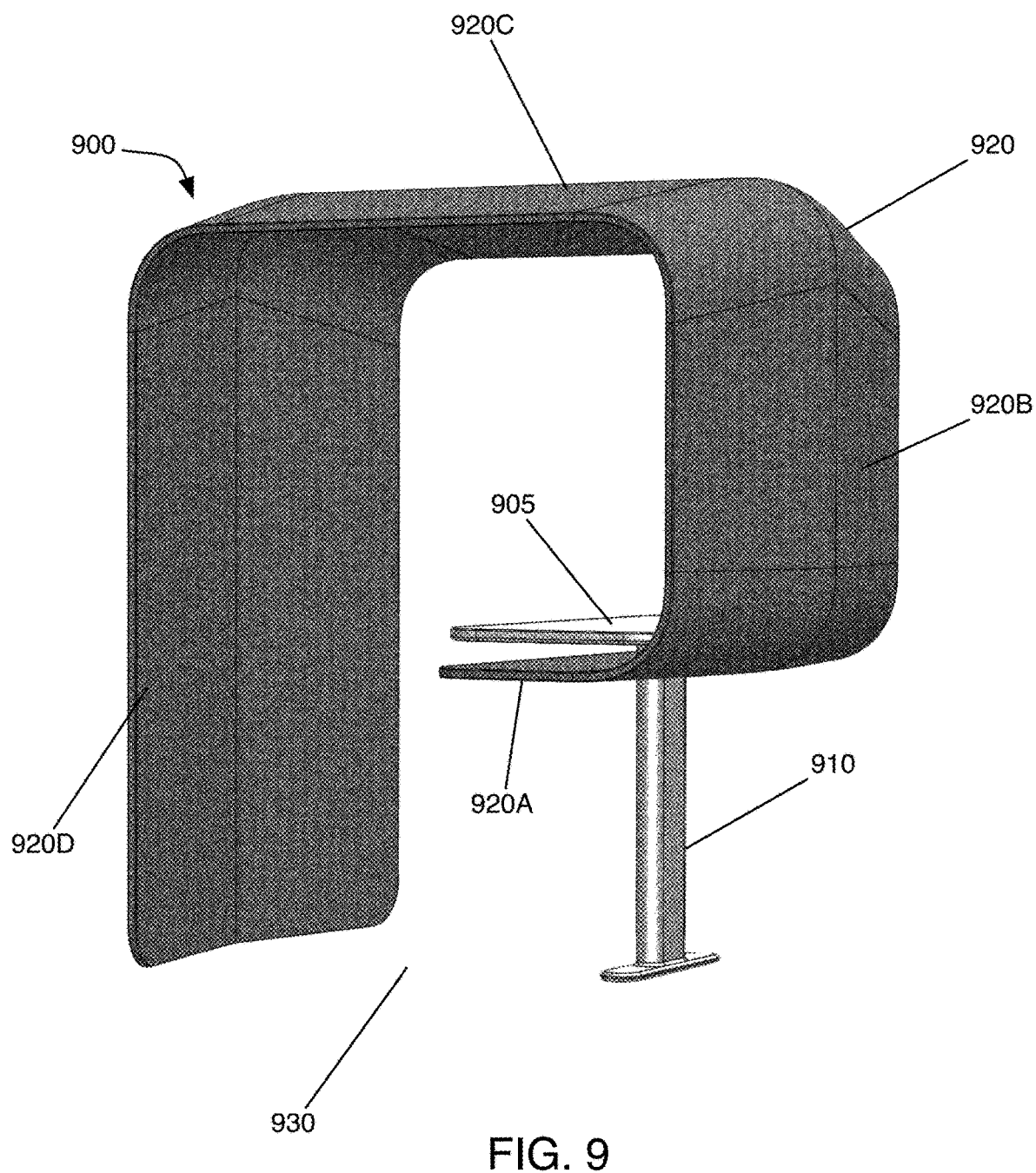
FIG. 9 is a front perspective view of a workspace, in accordance with another embodiment.

FIG. 9 illustrates one such embodiment. FIG. 9 is a front perspective view of an office furniture component providing workspace 900 for use by individuals or very small groups (e.g. two people working together). Work surface 905 is supported by pedestal 910, and is sized to facilitate typical office work, such as a small desktop size. Enclosure 920 includes portion 920A mounted to pedestal 910 and wrapping around underneath work surface 905, with front wall 920B extending upwards in front of the workspace occupant. Top surface 920C partially encloses the occupant and provides a strong sense of place, while rear wall 920D extends downward behind the occupant to floor surface 930, which provides further support for enclosure 920. Sides of workspace 900 remain open, providing an occupant with easy access to and from the workspace, as well as controlled levels of awareness of, and opportunity for collaboration with, others. In the embodiment of FIG. 9, the walls of enclosure 920 may be formed with a central ridge and two side portions forming an obtuse angle, as described in connection with above embodiments. Likewise, in other embodiments, the walls of enclosure 920 may have other cross-section shapes, including curved.

Figure 10:
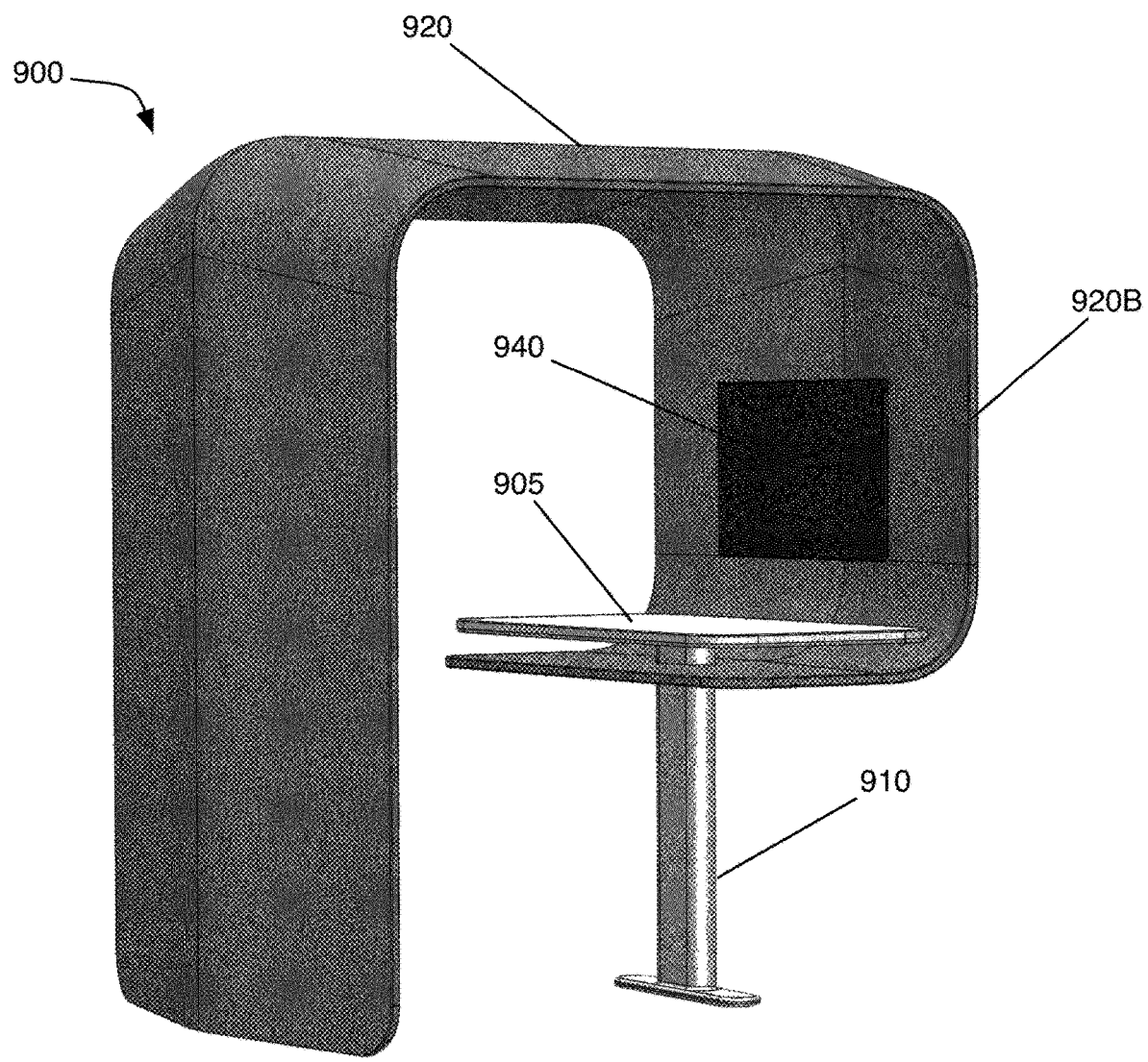
FIG. 10 is a rear perspective view of the workspace embodiment of FIG. 9.

FIG. 10 is a rear perspective view of workspace 900. FIG. 10 shows display screen 940, mounted on an inside surface of enclosure front wall 920B, above work surface 905, operating analogously to display screen 615A in the embodiment of FIG. 8. This and other electronic systems (such as speakers, microphones, contextual lighting, control panels, integration cables and communication hubs, and the like) may be integrated into workspace 900 to provide an occupant with convenient and high-quality systems with which to interact during work, similarly to the implementation of such systems in other embodiments described above. Multiple workspaces 900 may be installed through an open floor plan office space, in order to provide workers with levels of privacy, separation and focus, without the isolation and space-inefficiency of a traditional closed office.

Figure 11:
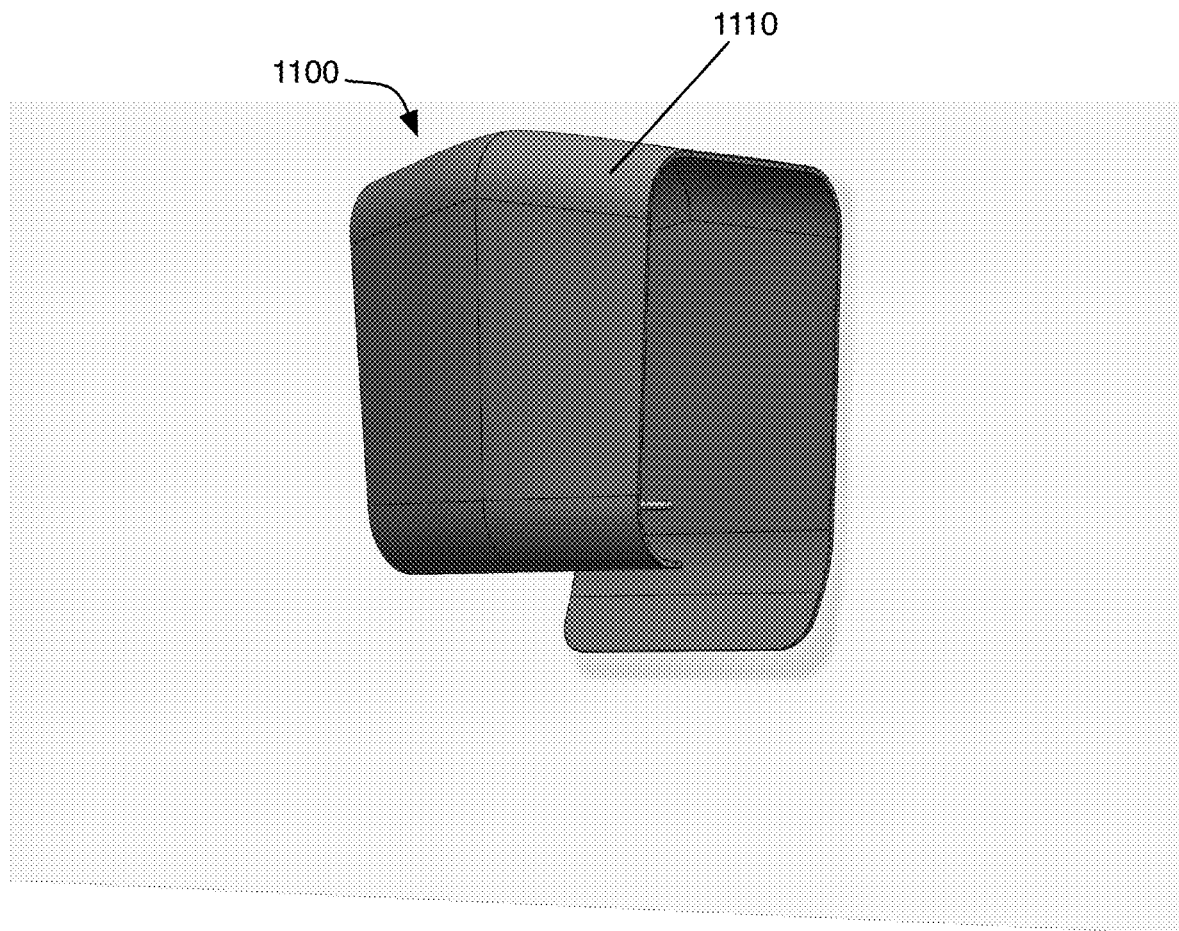
FIG. 11 is a front perspective view of yet another workspace embodiment, as mounted to a wall surface.
Figure 12:
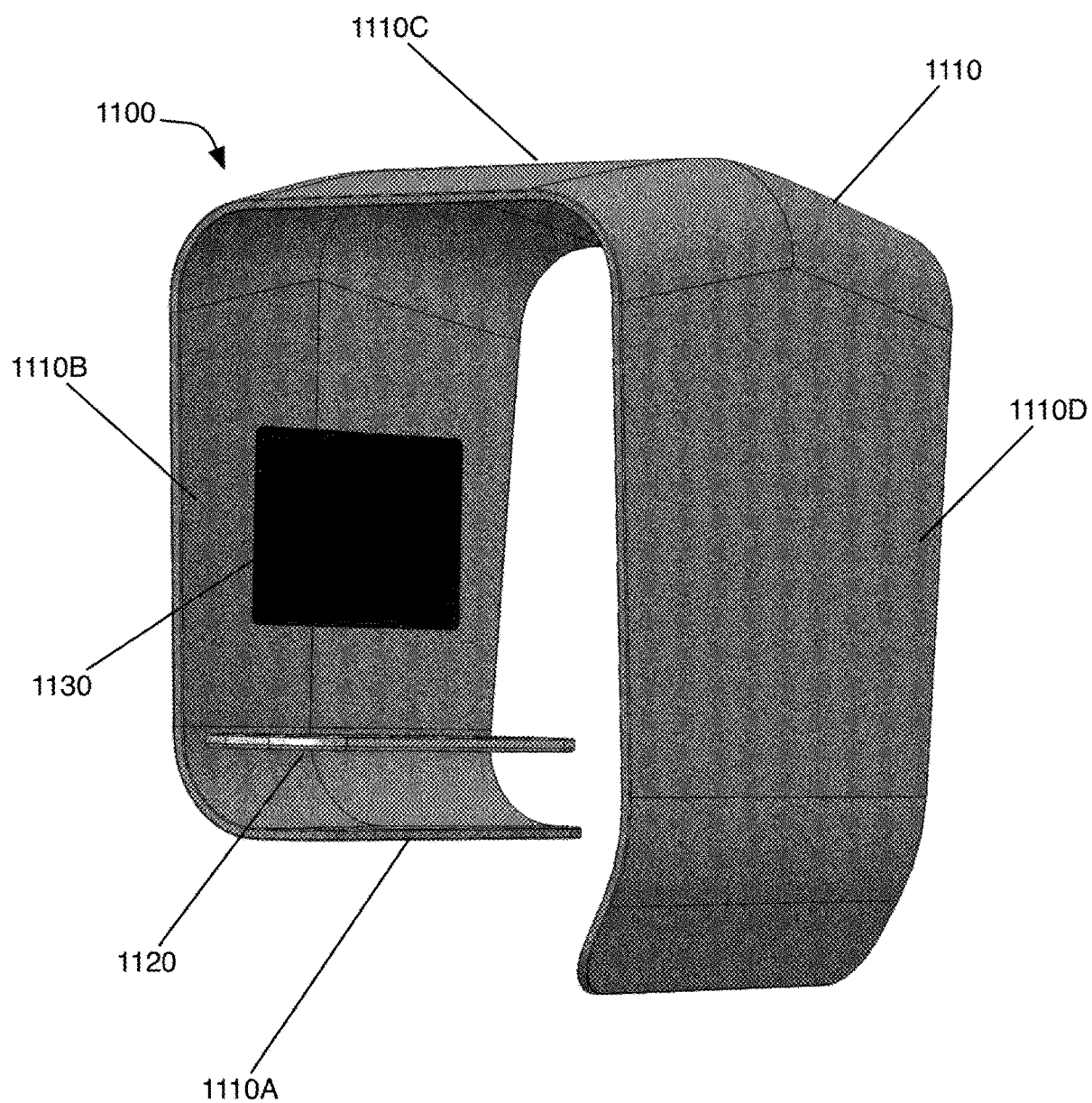
FIG. 12 is a rear perspective view of the workspace of FIG. 11.
Figure 13:
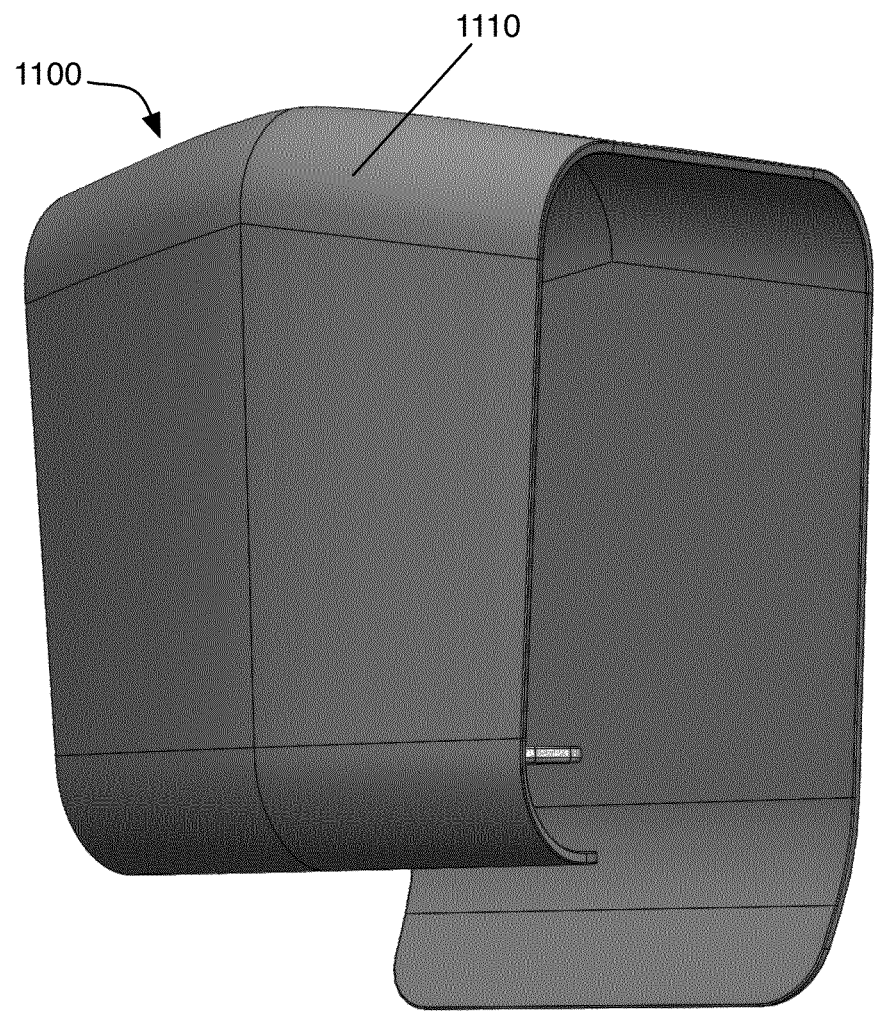
FIG. 13 is a front perspective view of the workspace of FIG. 11.

Yet other embodiments may be provided with varying sizes and configuration. FIG. 11 illustrates a wall-mounted workspace 1100. FIG. 12 is a rear perspective view of workspace 1100. FIG. 13 is a front perspective view of workspace 1100. Workspace 1100 includes enclosure 1110 and work surface 1120. Enclosure 1110 includes bottom flare 1110A extending partially beneath work surface 1120, front surface 1110B extending upwards to top surface 1110C, and rear surface 1110D extending downwards behind an occupant, preferably to a level beneath the plane of work surface 1120, and potentially lower than front flange 1110A. Work surface 1120 is secured to a lower inside portion of enclosure front wall 1110B. Workspace 1100 includes integrated display screen 1130, mounted on an inside surface of front panel 1110B, and may include other electronic systems and components, such as, without limitation, one or more of: speakers, microphones, contextual lighting, control panels, cables, communication hubs, and the like. Workspace 1100 may be mounted to a wall within an office space, such as by securing rear panel 1110D against a wall as shown in FIG. 11. Workspace 1100 is compact in size and, particularly when wall-mounted, consumes minimal footprint within an office area. Work surface 1120 may be compact in size, but sufficient for supporting a notepad, meeting materials, small electronic devices, or the like. Workspace 1100 may be highly effective as a short-term work space for, e.g., video-conferencing or conducting a telephone call.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or any appended claims.

The invention claimed is:

1. An office furniture apparatus comprising:
a single, unitarily formed workspace enclosure and a support positioning the enclosure over a floor surface; wherein
the workspace enclosure comprises a continuously-connected top surface, a left side surface, a right side surface and a bottom surface, the continuously-connected surfaces partially enclosing an interior space containing a work surface that is simultaneously accessible to multiple individuals through open front and back portions.

2. The office furniture apparatus of claim 1, in which the support comprises a pedestal.

3. The office furniture apparatus of claim 2, in which the pedestal comprises a lift for positioning the enclosure at variable heights relative to the floor surface.

4. The office furniture apparatus of claim 2, in which the support further comprises a weighted base.

5. The office furniture apparatus of claim 2, in which the support further comprises a base mechanically secured to the floor surface.

6. The office furniture apparatus of claim 1, in which the top, left side, right side and bottom surfaces form a continuous loop around the interior space.

7. The office furniture apparatus of claim 6, in which the enclosure continuous loop around the interior space is generally rectangular in cross-section with rounded corners.

8. The office furniture apparatus of claim 1, in which the interior space is about seven feet in length and three feet in width.

9. The office furniture apparatus of claim 1, wherein the work surface comprises a rigid flat work surface mounted within the interior space.

10. The office furniture apparatus of claim 9, further comprising a lighting fixture mounted proximate the enclosure top surface.

11. The office furniture apparatus of claim 10, in which the lighting fixture comprises a plurality of light sources, a first subset of the light sources being directed downwards towards the work surface, and a second subset of the light sources being directed outwards towards the open front portion of the enclosure, and a third subset of the light sources being directed outwards towards the open rear portion of the enclosure.

12. The office furniture apparatus of claim 11, further comprising a first video camera mounted within the enclosure and having a field of view encompassing at least a portion of the open front and back portions of the enclosure.

13. The office furniture apparatus of claim 12, further comprising a lighting controller controlling illumination of the plurality of light sources, the lighting controller responsive to changes in activation status of the first video camera to modify illumination of the second and/or third subset of light sources.

14. The office furniture apparatus of claim 13, wherein the lighting controller increases the intensity of the second and/or third subset of light sources in response to activation of the first video camera.

15. The office furniture apparatus of claim 13, wherein the lighting controller decreases the intensity of the second and/or third subset of light sources in response to deactivation of the first video camera.

16. The office furniture apparatus of claim 12, in which the first video camera is mounted proximate an inner surface of the enclosure at a first end of the interior space;
the apparatus further comprising a video display screen mounted proximate the first video camera.

17. The office furniture apparatus of claim 11, further comprising a second video camera mounted within the enclosure and having a field of view encompassing at least a portion of the work surface.

18. The office furniture apparatus of claim 17, further comprising a lighting controller controlling illumination of the plurality of light sources, the lighting controller responsive to activation of the second video camera to increase illumination of a subset of the light sources directed towards said portion of the work surface.

19. The office furniture apparatus of claim 11, further comprising a lighting controller responsive to inputs indicative of an operational status of one or more electronic systems integrated with the office furniture apparatus, in order to vary illumination of the plurality of light sources.

20. The office furniture apparatus of claim 11, wherein the plurality of light sources comprises light sources having two or more color temperatures; the apparatus further comprising a lighting controller responsive to inputs indicative of an operational status of one or more electronic systems integrated with the office furniture apparatus, in order to vary the color temperature of light from the plurality of light sources.

21. The office furniture apparatus of claim 11, further comprising a lighting controller responsive to inputs indicative of an operational status of one or more electronic systems integrated with the office furniture apparatus, in order to vary the distribution of illumination within the interior space.

22. The office furniture apparatus of claim 1, in which the top surface, left side surface, right side surface and bottom surface each have an exterior surface featuring a central ridge joining two generally flat portions to form an obtuse angle about a centerline extending from the central ridge towards a center portion of the office furniture apparatus.

23. The office furniture apparatus of claim 1, in which the top surface, left side surface, and right side surface each have an interior surface formed from two generally flat portions to form an obtuse angle about a centerline extending between the generally flat portions towards a center portion of the office furniture apparatus.

24. The office furniture apparatus of claim 1, in which one or more of the top surface, left side surface, right side surface and bottom surface each has cross-section forming a curve.

25. An office furniture apparatus comprising:
   a rigid, flat work surface oriented horizontally;
   a support positioning the work surface over a floor surface; and
   a workspace enclosure formed from a single continuous surface comprised of a front wall, the front wall connected with a top wall, the top wall connected with a rear wall, the enclosure further defining an interior space encompassing the work surface and having open side portions, wherein an occupant may be positioned within the interior space to use the work surface.

26. The office furniture apparatus of claim 25, the workspace enclosure further comprising a bottom wall extending from the front wall at least partially beneath the work surface.

27. The office furniture apparatus of claim 25, in which the rear wall extends down to the floor surface, thereby helping support the enclosure.

28. The office furniture apparatus of claim 25, wherein the enclosure comprises curved portions interconnecting the front wall with the top wall and interconnecting the top wall with the rear wall.

29. The office furniture apparatus of claim 25, in which the front wall, top wall and rear wall each feature a central ridge joining two generally flat portions to form an obtuse angle about a centerline extending from the central ridge towards a center portion of the office furniture apparatus.

30. The office furniture apparatus of claim 25, further comprising:
   a video conferencing display screen mounted on an inside surface of the enclosure front wall, above the work surface.

31. A wall-mounted office furniture apparatus comprising:
   a rigid, flat work surface oriented horizontally;
   a single, unitarily formed workspace enclosure comprising a front wall to which the work surface is mounted, the front wall connected with a top wall, the top wall connected with a rear wall, wherein the rear wall is configured for mounting to a wall within an office space, the enclosure further defining an interior space encompassing the work surface and having open side portions, wherein an occupant may be positioned within the interior space to use the work surface.

32. The office furniture apparatus of claim 31, the workspace enclosure further comprising a bottom wall extending from the front wall at least partially beneath the work surface.

33. The office furniture apparatus of claim 32, the workspace enclosure further comprising a rear flange extending from a lower portion of the rear wall inwards into the interior space, the rear flange positioned at a height beneath the bottom wall.

34. The office furniture apparatus of claim 31, wherein the enclosure comprises curved portions interconnecting the front wall with the top wall and interconnecting the top wall with the rear wall.

35. The office furniture apparatus of claim 31, in which the front wall, top wall and rear wall each feature a central ridge joining two generally flat portions to form an obtuse angle about a centerline extending between the generally flat portions towards a center portion of the office furniture apparatus.

36. The office furniture apparatus of claim 31, further comprising:
   a video conferencing display screen mounted on an inside surface of the enclosure front wall, above the work surface.

* * * * *